(12) United States Patent
Zheng et al.

(10) Patent No.: US 12,522,745 B2
(45) Date of Patent: Jan. 13, 2026

(54) HYDROPHILIC ANTI-FOG NANO PAINT AND COATING FOR ENDOSCOPE

(71) Applicant: CHENGDU HONGBO JIAYUAN BIOTECHNOLOGY CO., LTD, Chengdu (CN)

(72) Inventors: Xun Zheng, Chengdu (CN); Zhihui Li, Chengdu (CN); Junling Guo, Chengdu (CN); Yunxiang He, Chengdu (CN); Xiaoling Wang, Chengdu (CN)

(73) Assignee: CHENGDU HONGBO JIAYUAN BIOTECHNOLOGY CO., LTD, Chengdu (CN)

( * ) Notice: Subject to any disclaimer, the term of this patent is extended or adjusted under 35 U.S.C. 154(b) by 311 days.

(21) Appl. No.: 18/346,258

(22) Filed: Jul. 2, 2023

(65) Prior Publication Data

US 2023/0348749 A1 Nov. 2, 2023

Related U.S. Application Data

(63) Continuation of application No. PCT/CN2022/124498, filed on Oct. 11, 2022.

(30) Foreign Application Priority Data

Nov. 17, 2021 (CN) .................... 202111362609.X (51) Int. Cl.
| | | |
|---|---|---|
| *C09D 161/04* | (2006.01) |
| *A61B 1/12* | (2006.01) |
| *A61L 31/10* | (2006.01) |
| *A61L 31/14* | (2006.01) |
| *C09D 5/00* | (2006.01) |
| *C09D 7/20* | (2018.01) |
| *C09D 7/63* | (2018.01) |

(52) U.S. Cl.
CPC ............ *C09D 161/04* (2013.01); *A61L 31/10* (2013.01); *A61L 31/14* (2013.01); *C09D 5/00* (2013.01); *C09D 7/20* (2018.01); *C09D 7/63* (2018.01); *A61B 1/127* (2013.01)

(58) Field of Classification Search
CPC .......... C09D 161/04; C09D 5/00; C09D 7/20; C09D 7/63; A61L 31/10; A61L 31/14; A61B 1/127
See application file for complete search history.

(56) References Cited

FOREIGN PATENT DOCUMENTS

| CN | 109224873 A | * | 1/2019 | ............. B01D 69/02 |
| CN | 113097578 A | | 7/2021 | |
| CN | 113736298 A | | 12/2021 | |
| CN | 113930093 A | | 1/2022 | |

* cited by examiner

*Primary Examiner* — Crystal J Lee
(74) *Attorney, Agent, or Firm* — Nitin Kaushik

(57) ABSTRACT

A hydrophilic anti-fog nano paint for endoscope is provided. The paint includes, in parts by weight, 1-10 parts of plant polyphenols, 0.1-2 parts of metal ions, 0.1-0.5 parts of biomass molecules, 10-20 parts of additives and 250 parts of solvents. When coated on a substrate surface and dried, the paint forms a coating in which the plant polyphenols and metal ions combine to form a plant polyphenol-metal nano complex. Together with biomass molecules, the plant polyphenol-metal nano complex produces a hydrophilic nano-film on the laparoscope surface, thereby enhancing the hydrophilicity of the lens interface.

2 Claims, 6 Drawing Sheets

Embodiment 1    Embodiment 2    Embodiment 3    Embodiment 4

Embodiment 5    Embodiment 6    Embodiment 7    Embodiment 8

Embodiment 1

Embodiment 4

HYDROPHILIC ANTI-FOG NANO PAINT AND COATING FOR ENDOSCOPE

CROSS-REFERENCE TO RELATED APPLICATIONS

The application claims priority to Chinese patent application No. 202111362609X, filed on Nov. 17, 2021, the entire contents of which are incorporated herein by reference.

TECHNICAL FIELD

The invention relates to the technical field of nanofilm, in particular to a hydrophilic anti-fog nano paint and coating for endoscope.

BACKGROUND

Minimally invasive surgery with the characteristics of small trauma and quick recovery has been widely applied to all aspects of clinical practice, including general surgery, gynecology, urology, and hepatobiliary surgery. Endoscopy is an important part of minimally invasive surgery. Endoscope is an advanced medical device that integrates mechanical, electrical, and optical technology. It uses a cold light source to provide illumination. During abdominal surgery, a laparoscopic lens with a camera system and light source is inserted into the abdominal cavity, and the images captured and displayed by the corresponding endoscopy and image software. The surgeon uses special laparoscopic instruments to perform the operation through a monitor screen that displays images of the patient's organs from different angles. Specifically, the abdominal cavity temperature can reach 33-35° C. and the humidity is about 90%, the fog may form on the lens due to the large difference in temperature between the patient's body cavity and the external environment during the operation. When the cold endoscope lens is inserted into the cavity, the water vapor will condense on the lens to form fog drops. Due to the uneven size and distribution of fog drops, when the parallel incident light hits the endoscope mirror with fog drops, the surface of the endoscope will reflect the light in all directions, resulting in random diffuse reflection of the light in different angles and consequentially leading to a specular blur and blurred vision. According to the clinical data, clear surgical vision field is the key to ensure the success of laparoscopic surgery, reduce intraoperative injury and shorten the operation time. Therefore, it is an urgent to develop the effective and safe anit-fogging technology for endoscope lens.

The commonly used methods at home and abroad are using medical hot water, iodophor, etc. Hot water method is to preheat the lens with sterile saline at 60-80° C. for 5-10 minutes. The mechanism is to increase the temperature of the lens in a short time, so as to make it close to the temperature in the abdominal cavity, preventing water vapor from continuing to condense and achieving the effect of anti-fog. But heat treatment might cause scald, and excessive hot will shorten the lifetime of the lens. The anti-fogging effects generally would not last long for an operation (over 30 minutes), which might disappeared in less than few minutes and re-treatment with hot water is needed. Iodophor wiping method is to coat the lens surface with iodophor to form a protective film, isolate and prevent the hot air in the abdomen from attaching to the lens, weaken the adhesion of fog to the lens, make the image clear and provide anti-fogging effect. But iodophor is a colored liquid, which will affect the clarity of the surgical visual field, affect the surgeon's judgment of the color of the abdominal organs, and also might cause allergic reactions. These methods are not the optimal choice for clinical surgery because of the shortcomings of short anti-fog time and repeated treatment, as well as the possibility of introducing intraoperative secondary stimulation injury and increasing the chance of contamination.

At present, most of the methods to realize the anti-fogging of lenses are to prepare hydrophobic structures on the surface of lenses to prevent the deposition of water droplets and form fog drops to achieve the anti-fog effect. A small number of products adopt hydrophilic synthetic polymers, such as waterborne polyurethane, waterborne polyester, and hydrophilic polypropylene polymers, which are attached to the surfaces of eyeglasses, mirrors, glass windows and so on to isolate the water vapor from substrate surface and achieve anti-fog effect. However, this kind of material has low biocompatibility, so it cannot be used on the endoscope lens.

SUMMARY

To solve the problems existing in the prior art, the invention provides a hydrophilic anti-fog nano paint and coating for endoscope with good biocompatibility, super hydrophilic, and high efficiency in preventing condensation of water drops to form fogs.

The technical scheme of the invention is: a hydrophilic anti-fog nano paint for endoscope, which includes the following according to the number of weight parts: plant polyphenols of 1-10 parts, metal ions of 0.1-2 parts, biomass molecules of 0.1-0.5 parts, additives of 10-20 parts and solvents of 250 parts.

Further, the plant polyphenol is a mixture of one, two or more of tannic acid, larch tannin, and arbutus tannin in any proportion.

Further, the metal ion is a mixture of one, two or more of ferric ion $Fe^{3+}$, zinc ion $Zn^{2+}$ and samarium ion $Sm^{3+}$ in any proportion.

Further, the biomass molecule is a mixture of one, two or more of betaine, cellulose, sodium alginate and chitosan in any proportion.

Further, the additive is glycerol.

Further, the solvent is a mixture of water and ethanol, including 75 parts of water and 175 parts of ethanol.

A coating made of hydrophilic anti-fog nano paint for endoscope: The paint is coated on the surface of the substrate, and the desired coating can be obtained after drying.

The beneficial effects of the invention are:
(1) The plant polyphenols in the invention can adhere to the surface of the hydrophobic endoscope through various interaction forces. Nanocomplex formed by complexation with metal ions is easy to form hydrophilic nanofilm on endoscope surface. The complexation of plant polyphenols with metal ions enhances the film forming performance of the nano paint on hydrophobic endoscope surfaces.
(2) The invention also adds biomass molecules for the paint, so that the hydrophilicity of the endoscope surface can be enhanced. When biomass molecules mixed with complexes are coated on the interface, the hydrophilicity of the interface is significantly improved compared with that coated with biomass molecules alone. The invention utilizes layered compounding technology of biomass material to enhance the hydrophilicity and anti-fog performance of the interface cooperatively compared with the effect of existing single hydrophilic polymer.

(2) The biomass molecule in the invention has good biocompatibility and will not cause clinical side effects when it comes into contact with tissues, and can meet the needs of clinical use; Compared with the existing anti-fog materials, high biological safety is the greatest advantage of the paint in the invention.

(3) The biomass coating material used in the invention can improve the efficiency of endoscopic surgery, shorten the operation time, and reduce the surgical complexity caused by the secondary treatment of endoscope caused by the fog. Compared with the existing clinical methods (iodophor wiping mirror method and hot water wetting mirror method), the coating technology of the invention greatly prolongates the anti-fog time, and the nano coating has no color, will not interfere with the endoscopic imaging, and improves the efficiency of endoscopic surgery.

DETAILED DESCRIPTION OF THE EMBODIMENTS

Next, the invention is further explained in combination with the drawings and specific embodiments.

A hydrophilic anti-fog nano paint for endoscope, which includes the following according to the number of weight parts: plant polyphenols of 1-10 parts, metal ions of 0.1-2 parts, biomass molecules of 0.1-0.5 parts, additives of 10-20 parts and solvents of 250 parts. The mass ratio of plant polyphenols to metal ions is 10:1-5:1.

The plant polyphenol is a mixture of one, two or more of tannic acid, larch tannin and arbutus tannin in any proportion. The metal ion is a mixture of one, two or more of $Fe^{3+}$, $Zn^{2+}$, and $Sm^{3+}$ in any proportion. Ferric ion comes from ferric chloride hexahydrate, zinc ion comes from zinc sulfate heptahydrate, and samarium ion comes from samarium nitrate hexahydrate; it can be any other compound that can provide the metal ions mentioned above.

The biomass molecule is a mixture of one, two or more of betaine, cellulose, sodium alginate and chitosan in any proportion. The additive is glycerol. The solvent is a mixture of water and ethanol, including 75 parts of water and 175 parts of ethanol.

The paint is coated on the surface of the substrate, and the desired coating can be obtained after drying. In the following embodiments, sapphire sheet is used as the base material, and the paint is evenly coated on its surface with medical cotton ball to form a thin layer of water film, which is placed at room temperature for volatilization.

Embodiment 1

A hydrophilic anti-fog nano paint for endoscopy, which comprises tannic acid of 1 part, iron ion (trivalent) of 0.1 part, betaine of 0.25 parts, glycerin of 12.5 parts, water of 75 parts and ethanol of 175 parts.

The above paint is mixed well, the sapphire sheet is used as the base material, and the paint is evenly coated on its surface with medical cotton ball to form a thin layer of water film, which is placed at room temperature for volatilization.

Embodiment 2

A hydrophilic anti-fog nano paint for endoscope, which comprises: Tannic acid of 1 part, iron ion (trivalent) of 0.1 part, cellulose of 0.125 parts, glycerin of 12.5 parts, water of 75 parts, and ethanol of 175 parts.

The above paint is mixed well, the sapphire sheet is used as the base material, and the paint is evenly coated on its surface with medical cotton ball to form a thin layer of water film, which is placed at room temperature for volatilization.

Embodiment 3

A hydrophilic anti-fog nano paint for endoscopy, which comprises tannic acid of 1 part, iron ion (trivalent) of 0.1 part, sodium alga acid of 0.2 parts, glycerin of 12.5 parts, water of 75 parts and ethanol of 175 parts.

The above paint is mixed well, the sapphire sheet is used as the base material, and the paint is evenly coated on its surface with medical cotton ball to form a thin layer of water film, which is placed at room temperature for volatilization.

Embodiment 4

A hydrophilic anti-fog nano paint for endoscopy, which comprises tannic acid of 1 part, iron ion (trivalent) of 0.1 part, chitosan 0.125 parts, glycerin of 12.5 parts, water of 75 parts and ethanol of 175 parts.

The above paint is mixed well, the sapphire sheet is used as the base material, and the paint is evenly coated on its surface with medical cotton ball to form a thin layer of water film, which is placed at room temperature for volatilization.

Embodiment 5

A hydrophilic anti-fog nano paint for endoscopy, which comprises tannic acid of 1 part, zinc ion (bivalent) of 0.1 part, betaine of 0.25 parts, glycerin of 12.5 parts, water of 75 parts and ethanol of 175 parts.

The above paint is mixed well, the sapphire sheet is used as the base material, and the paint is evenly coated on its surface with medical cotton ball to form a thin layer of water film, which is placed at room temperature for volatilization.

Embodiment 6

A hydrophilic anti-fog nano paint for endoscopy, which comprises larch tannin of 1 part, samarium ion (trivalent) of 0.1 part, betaine of 0.25 parts, glycerin of 12.5 parts, water of 75 parts and ethanol of 175 parts.

The above paint is mixed well, the sapphire sheet is used as the base material, and the paint is evenly coated on its surface with medical cotton ball to form a thin layer of water film, which is placed at room temperature for volatilization.

Embodiment 7

A hydrophilic anti-fog nano paint for endoscope, which comprises: bayberry tannin of 1 part, iron ion (trivalent) of 0.1 part, cellulose of 0.125 parts, glycerin of 12.5 parts, water of 75 parts, and ethanol of 175 parts.

The above paint is mixed well, the sapphire sheet is used as the base material, and the paint is evenly coated on its surface with medical cotton ball to form a thin layer of water film, which is placed at room temperature for volatilization.

Embodiment 8

A hydrophilic anti-fog nano paint for endoscopy, which comprises bayberry tannin of 1 part, zinc ion (bivalent) of 0.1 part, sodium alga acid of 0.2 parts, glycerin of 12.5 parts, water of 75 parts and ethanol of 175 parts.

The above paint is mixed well, the sapphire sheet is used as the base material, and the paint is evenly coated on its surface with medical cotton ball to form a thin layer of water film, which is placed at room temperature for volatilization.

To illustrate the beneficial effect of the invention, the comparative examples 1-7 are set.

Comparative Example 1

A biomass-based hydrophilic anti-fog nano paint with high metal content, which comprises tannic acid of 1 part, iron ion (trivalent) of 0.45 parts, betaine of 0.5 parts, glycerin of 12.5 parts, water of 75 parts and ethanol of 175 parts.

Mix the above paint evenly and set aside for observation.

Comparative Example 2

A biomass-based hydrophilic anti-fog nano paint with no metal complexation, which comprises tannic acid of 1 part, betaine of 0.5 parts, glycerin of 12.5 parts, water of 75 parts and ethanol of 175 parts.

The above paint is mixed well, the sapphire sheet is used as the base material, and the paint is evenly coated on its surface with medical cotton ball to form a thin layer of water film, which is placed at room temperature for volatilization.

Comparative Example 3

A additive-free biomass-based hydrophilic anti-fog nano paint with metal complexation, which comprises bayberry tannin of 1 part, zinc ion (bivalent) of 0.1 part, betaine of 0.5 parts, water of 87 parts and ethanol of 175 parts.

Mix the above paint evenly and set aside for observation.

Comparative Example 4

A biomass-molecule-free plant-polyphenol-based hydrophilic anti-fog nano paint with metal complexation, which comprises tannic acid of 1 part, iron ion (trivalent) of 0.1 part, glycerin of 12.5 parts, water of 75 parts and ethanol of 175 parts.

The above paint is mixed well, the sapphire sheet is used as the base material, and the paint is evenly coated on its surface with medical cotton ball to form a thin layer of water film, which is placed at room temperature for volatilization.

Comparative Example 5

A biomass-molecule hydrophilic anti-fog nano paint without plant polyphenol-metal complexation, which comprises betaine of 0.5 parts, glycerin of 12.5 parts, water of 75 parts and ethanol of 175 parts.

The above paint is mixed well, the sapphire sheet is used as the base material, and the paint is evenly coated on its surface with medical cotton ball to form a thin layer of water film, which is placed at room temperature for volatilization.

Comparative Example 6

Commercial disinfectant povidone iodine (5%) is used as laparoscopic anti-fog agent. The preparation method is as follows: Using sapphire sheet as the base material, povidone iodine is evenly coated on the surface with medical cotton ball to form a film, and set aside at room temperature for volatilization.

Comparative Example 7

The comparative example is blank sapphire sheet.

The hydrophilicity of embodiments 1-8 and comparative examples 1-7 is tested. 4 μL deionized water is dropped on the surface of the cured sample and measured with a contact angle tester in the range of 20-25° C. The test results are shown in Tables 1 and 2 and FIGS. 1 and 2.

TABLE 1

Droplet contact angle test results of embodiment

| Embodiment | 1 | 2 | 3 | 4 | 5 | 6 | 7 | 8 |
|---|---|---|---|---|---|---|---|---|
| Contact angle (°) | 5.3 | 8.1 | 6.6 | 7.5 | 6.4 | 7.6 | 8.9 | 7.6 |

TABLE 2

Droplet contact angle test results of comparative example

| Comparative example | 1 | 2 | 3 | 4 | 5 | 6 | 7 |
|---|---|---|---|---|---|---|---|
| Contact angle (°) | NA | NA | 23.7 | 10.9 | 51.2 | 12.9 | 61.9 |

NA in Table 2 indicates that the sample has precipitated, and the paint cannot be stably dispersed in the solution, which makes it impossible to conduct subsequent performance tests.

Figure 1:
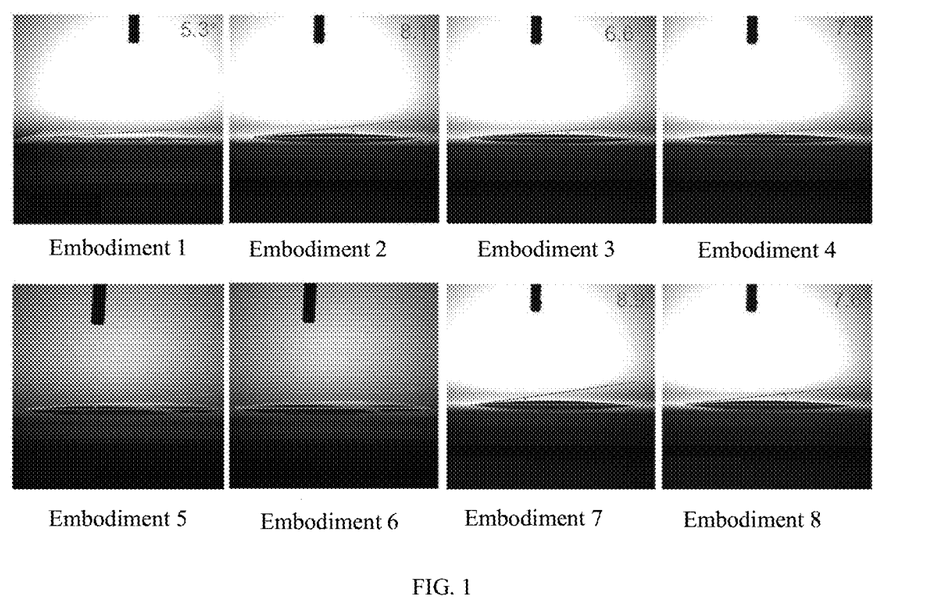
FIG. 1 is a schematic diagram of the contact angle of water droplets obtained after the paint applied on the sapphire sheet in the embodiment of the invention.
Figure 2:
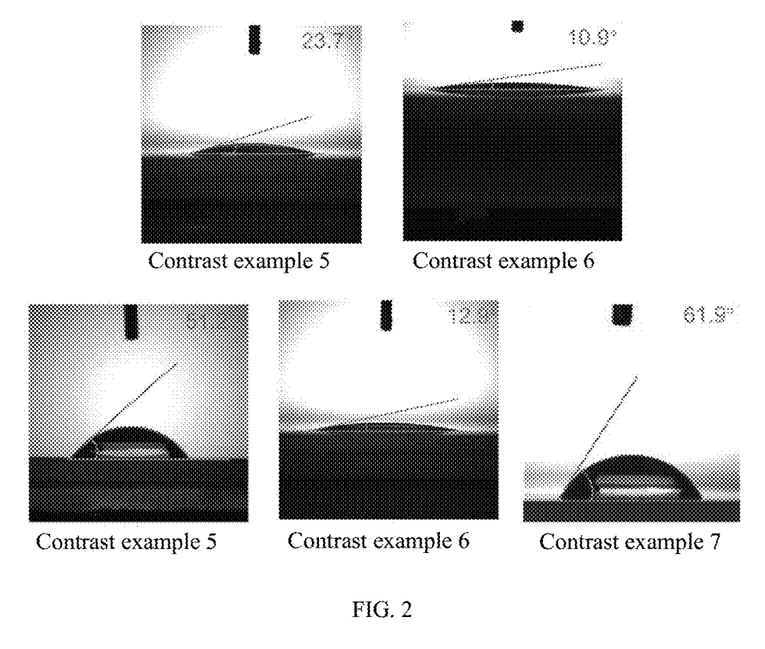
FIG. 2 is a schematic diagram of the contact angle of water droplets obtained after the paint applied on the sapphire sheet in the comparative examples 3-7 of the invention.

As can be seen from Tables 1 and 2 and FIGS. 1 and 2, cellulose has the highest hydrophobicity among concentrated biomass molecules, but it can also reduce the contact angle of water droplets to less than 10°.

As can be seen from Tables 1 and 2 and FIGS. 1 and 2, compared with medical povidone iodine disinfectant (comparative example 6), biomass complex nano-coating based on plant polyphenol-metal complex (results obtained in embodiments 1-8) can lower the contact angle of water droplets on the surface of sapphire sheet and has better hydrophilicity. Biomass complex nano-coating based on plant polyphenol-metal complex (embodiments 1-8) vs an individual plant polyphenol-metal complex coating (comparative example 3) or an individual biomass molecular coating (comparative example 5). The surface of sapphire sheet has a lower contact angle of water droplets, indicating that the coating obtained by the invention can improve the hydrophilicity of sapphire sheet interface.

The anti-fog performance of embodiments 1-8 and comparative examples 1-7 is tested. Anti-fog effect after setting the water bath at 60° C., placing the sapphire sheet on the stand and testing for 30 minutes. The test results are shown in Tables 3 and 4 and FIGS. 3 and 4.

TABLE 3

Anti-fog effect test results of embodiment

| Embodiment | 1 | 2 | 3 | 4 | 5 | 6 | 7 | 8 |
|---|---|---|---|---|---|---|---|---|
| Anti-fog effect | There are no fog drops and the pattern is clearly visible | | | | | | | |

TABLE 4

Anti-fog effect test results of comparative example

| | Comparative example | | | | | | |
|---|---|---|---|---|---|---|---|
| | 1 | 2 | 3 | 4 | 5 | 6 | 7 |
| Anti-fog effect | NA | NA | There are condensed water droplets, spherical interfaces refract light, and the patterns are blurred | Fog drops appear within 10 minutes, and the pattern is blurred 30 minutes later | The water drops condense and the patterns are blurred | There are condensed water droplets, sapphire sheet is yellowing, affecting light transmission | The water drops condense and the patterns are blurred |

Figure 3:
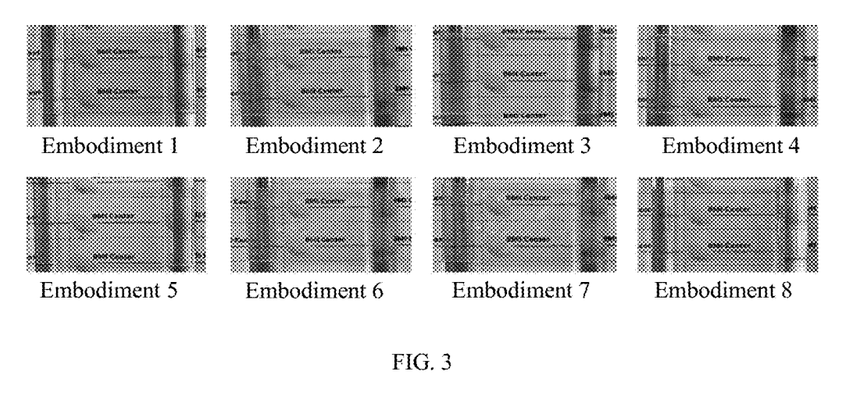
FIG. 3 is a schematic diagram of the test results of anti-fog effect obtained after the paint applied on the sapphire sheet in the embodiment of the invention.
Figure 4:
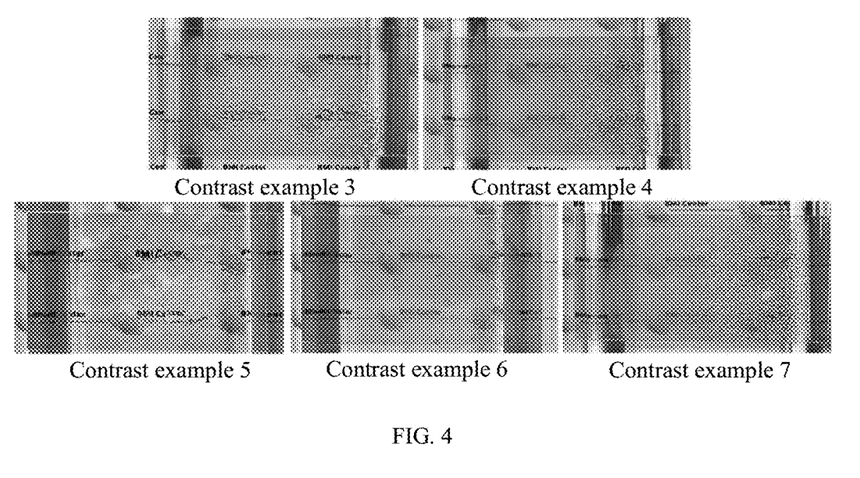
FIG. 4 is a schematic diagram of the test results of anti-fog effect obtained after the paint applied on the sapphire sheet in the comparative examples 3-7 of the invention.
Figure 5:
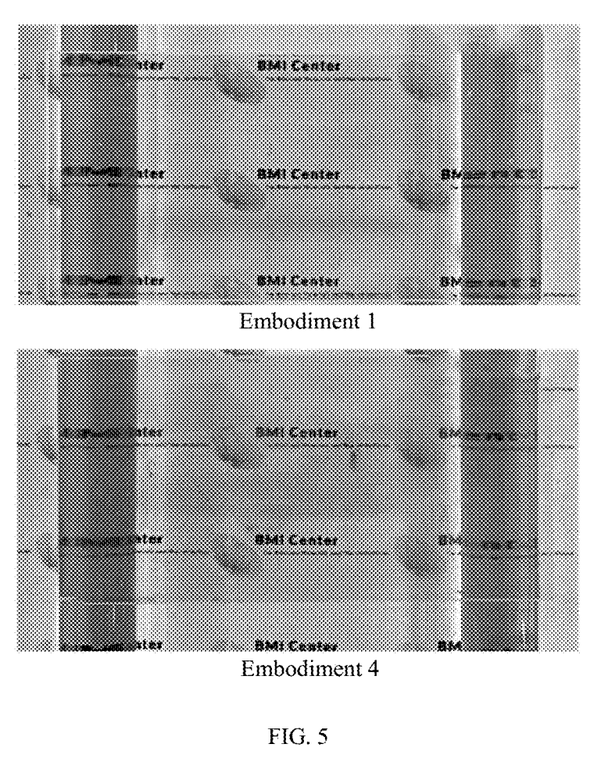
FIG. 5 is a schematic diagram of the test results of anti-fog effect obtained after the paint applied on the sapphire sheet in Embodiment 1 and comparative example 4 of the invention.

It can be seen from Table 3 and FIG. 3 (the number in FIG. 3 refers to the number of the embodiment) that the bio-based hydrophilic nano-coating based on plant polyphenol-metal complex (the invention) can fully wet the sapphire sheet interface, effectively reduce the contact angle of water droplets, improve the hydrophilicity of the interface, have a better anti-fog effect. Due to the lack of biomass molecules for comparative example 3, the hydrophilicity improvement of sapphire sheet interface is effective, so the anti-fog effect is not ideal. This comparative example reflects the synergistic anti-fog effect of the biomass molecule and plant polyphenol-metal ion complex. Due to the absence of metal ions in comparative example 4, it cannot form complexation with plant polyphenols, so the biomass material cannot be uniformly coated on the sapphire sheet to form nano-film, which cannot achieve the ideal anti-fog effect. Without the participation of plant polyphenols and metal ions in comparative example 5, it is difficult for biomass molecules to be coated on the hydrophobic sapphire sheet, resulting in no anti-fog effect. Medical povidone iodine (5%) in comparative example 6 cannot be evenly coated on the sapphire sheet, resulting in rapid condensation of water droplets and residual brown-yellow substance, which affects the imaging effect (as shown in FIG. 4).

Figure 6:
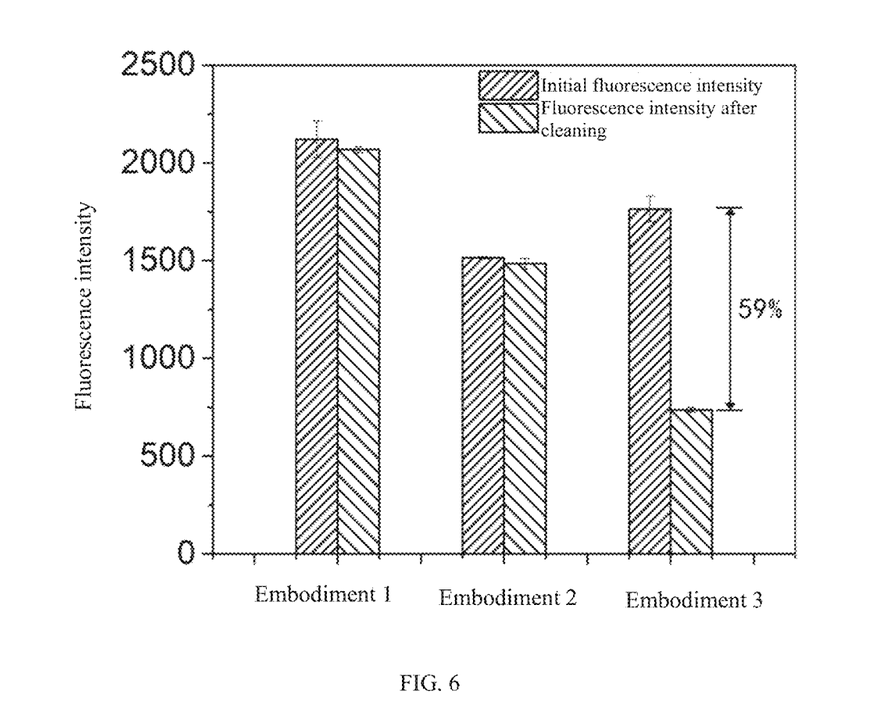
FIG. 6 is a schematic diagram of the test results of adhesion fastness obtained after the paint applied on the sapphire sheet in Embodiments 1&2 and comparative example 3 of the invention.

The adhesion stability of embodiments 1-2 and comparative example 4 is tested. In embodiments 1&2, and comparative example 4, fluorescein solution (0.1%) is added. The solution is sprayed on the sapphire glass sheet, and the fluorescence intensity is detected by a fluorescence spectrophotometer (Hitachi F-7000). The sapphire sheet is immersed in water for 30 minutes, and the fluorescence intensity is tested again after drying. The stability of the nano-film is demonstrated by the change of fluorescence intensity. The result is shown in FIG. 6. It can be seen from the test results that, due to the presence of metal ions in embodiments 1 and 2, the nano-film can exist stably on the sapphire sheet. Without polyphenols complexed by metal ions, the nano-film cannot form stably and easily falls off from the sapphire sheet.

The invention adopts a hydrophilic plant polyphenol, regulates the mixing ratio with metal ions to form a plant polyphenol-metal nano complex, and then adds biomass molecules to form a super hydrophilic interface and enhance the anti-fog effect. On the one hand, the complex of plant polyphenols and metal ions can form hydrophilic nanofilms on the surface of endoscope. On the other hand, the coating of biomass molecules on the surface of the endoscope is enhanced. Biomass molecules themselves are hydrophilic, but cannot be uniformly coated on the surface of the endoscope. The hydrophilicity of the endoscope surface is improved by using the complex plant polyphenols, metal ions and biomass molecules to form a composite system. The additives mainly enhance the stability of plant polyphenol-metal ion complex and biomass molecules in solution, so that nano-materials can be evenly dispersed in solution when used. When used, the coating is evenly coated on the surface of the endoscope. After the solvent evaporates, a layer of super hydrophilic nano-coating is formed on the surface to prevent the formation of fog droplets.

By combining plant polyphenols with metal ions, the invention can be used to easily to form hydrophilic nano-film on the surface of the laparoscope, so as to enhance the coating of biomass molecules (such as cellulose, sodium alginate, chitosan and betaine) on the surface of the laparoscope, and increase the interface hydrophilicity (contact angle of water droplets <10°). In contact with the mirror, the water vapor quickly spread to form a water film without condensation to form fog drops, so as to have an anti-fog effect. Natural biomass molecules have good biocompatibility and will not cause clinical side effects when they come into contact with tissues, which can meet the needs of clinical use. In addition, plant polyphenols are biomass-based materials.

What is claimed is:

1. A hydrophilic anti-fog nano paint for endoscope comprising:

plant polyphenols of 1-10 parts by weight, metal ions of 0.1-2 parts by weight, biomass molecules of 0.1-0.5 parts by weight, additives of 10-20 parts by weight, and solvents of 250 parts by weight;

wherein the biomass molecules comprise one or more selected from betaine, cellulose, sodium alginate, and chitosan;

wherein the plant polyphenols comprise one or more selected from tannic acid, larch tannin, and arbutus tannin;

wherein the metal ions comprise one or more selected from ferric ion $Fe^{3+}$, zinc ion $Zn^{2+}$, and samarium ion $Sm^{3+}$;

wherein the additives are glycerol; and wherein the solvents comprise 75 parts by weight of water and 175 parts by weight of ethanol.

2. A coating made of the hydrophilic anti-fog nano paint for endoscope adopted according to claim 1, wherein the paint is coated on a surface of a substrate, and dried to form the coating.

* * * * *